United States Patent
Goldman et al.

(10) Patent No.: US 7,894,406 B2
(45) Date of Patent: Feb. 22, 2011

(54) SYSTEM FOR ROUTING REMOTE VOIP EMERGENCY CALLS

(75) Inventors: Stuart Owen Goldman, Scottsdale, AZ (US); Kevin M. Patfield, Phoenix, AZ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 875 days.

(21) Appl. No.: 10/955,089

(22) Filed: Sep. 30, 2004

(65) Prior Publication Data
US 2006/0072549 A1  Apr. 6, 2006

(51) Int. Cl.
*H04W 4/00* (2009.01)
(52) U.S. Cl. ............... 370/338; 370/310; 455/404.1; 379/37
(58) Field of Classification Search ............ 370/338, 370/310, 310.2, 352, 351; 455/404.1, 404.2; 379/37–51
See application file for complete search history.

(56) References Cited

U.S. PATENT DOCUMENTS

| 6,678,357 | B2 * | 1/2004 | Stumer et al. ............... 379/45 |
| 6,922,565 | B2 * | 7/2005 | Rhodes et al. ............. 455/456.1 |
| 6,940,950 | B2 * | 9/2005 | Dickinson et al. ............. 379/45 |
| 7,027,564 | B2 * | 4/2006 | James ......................... 379/37 |
| 7,177,399 | B2 * | 2/2007 | Dawson et al. ............... 379/45 |
| 7,586,902 | B2 * | 9/2009 | Epley ......................... 370/352 |
| 2002/0068599 | A1 * | 6/2002 | Rodriguez et al. ........... 455/550 |
| 2003/0072431 | A1 * | 4/2003 | Lamy et al. ............. 379/211.01 |
| 2003/0174825 | A1 * | 9/2003 | Aldridge et al. ......... 379/207.15 |
| 2004/0190497 | A1 * | 9/2004 | Knox ......................... 370/352 |

* cited by examiner

*Primary Examiner*—Ricky Ngo
*Assistant Examiner*—Gary Mui
(74) *Attorney, Agent, or Firm*—Fay Sharpe LLP

(57) ABSTRACT

A method is provided for routing an emergency call from Customer Premises Equipment (CPE) to a Public Safety Answering Point (PSAP). The method includes: establishing a session over a packet-switched network (200) between a CPE (110) and a network node (302), such that the CPE (110) accesses a Public Switched Telephone Network (PSTN) (400) from the network node (302) via a telecommunications switch (500) associated with a first PSAP (320) serving a geographic region (300) different than where the CPE (110) is currently located; identifying a telephone number for a second PSAP (120) serving the geographic region (100) in which the CPE (110) is located; and, substituting the identified telephone number for a dialed telephone number when the dialed telephone number is indicative of an emergency call.

22 Claims, 2 Drawing Sheets

SYSTEM FOR ROUTING REMOTE VOIP EMERGENCY CALLS

FIELD

The present inventive subject matter relates to the telecommunication arts. Particular application is found in conjunction with public access emergency telecommunication services (e.g., emergency 911 calls) and the specification makes particular reference thereto. However, it is to be appreciated that aspects of the present inventive subject matter are also amenable to other like applications.

BACKGROUND

With reference to FIG. 1, packet switched networks (such as the Internet or a managed private internet 10) are being used to route voice telephone calls. Generally, this is known as voice-over-packet telephony, which includes, but is not limited to, VoIP (Voice over Internet Protocol). One of the advantages of voice-over-packet telephony is the ability for remote users to access the Public Switched Telephone Network (PSTN) 20 through their company's home telecommunication switch.

Various types of Customer Premises Equipment (CPE) are available for end users to participate in voice-over-packet telephony, e.g., an IP telephone, which may be a hardphone or a softphone running on a laptop computer or other like platform. For example, FIG. 1 shows a typical case where a user, in a remote location or geographic region 30 (e.g., Cleveland, Ohio), is using a softphone running on a laptop computer 40 to engage in voice-over-packet telephony. The computer 40 is connected over the Internet 10 back to the user's home location or geographic region 32 (e.g., Phoenix, Ariz.), e.g., back to the user's office or normal place of business. Accordingly, access to the PSTN 20 is achieved via the user's company home switch 50 (e.g., a class 5 switch such as the Lucent Technologies 5ESS or another like switch).

The foregoing is a beneficial arrangement since other callers can reach the user by dialing their normal office telephone number. Similarly, calls made by the remote user appear to come from the user's normal office telephone number, e.g., such that the normal office telephone number is displayed on the called party's caller-ID, if available. The user may also be able to utilize PBX (Private Branch eXchange) and/or Centrex features supported at their home office or home switch 50. This arrangement, however, can present certain problems for handling emergency calls, such as 911 calls.

As is known in the art, the PSTN 20 includes mechanisms for directing certain calls, such as an emergency 911 call, to a Public Safety Answering Point (PSAP). Commonly, different PSAPs serve different geographic regions. PSAP 60, for example, serves region 30, while PSAP 62, serves region 32. Accordingly, when a PSAP receives a 911 call, the corresponding regional safety officials or first responders (e.g., fire department, police, ambulance, etc.) can be called or mobilized as deemed appropriate for the circumstances. It is, therefore, desirable that 911 calls get routed to the PSAP serving the geographic region in which the calling party is currently located so that a proper response to the 911 call can be quickly and readily coordinated.

In the example shown in FIG. 1, if the remote user located in region 30 were to make a 911 call, it would appear to the PSTN 20 that the 911 call was originating from region 32 insomuch as the PSTN 20 was being access via the user's company home switch 50. Absent suitable provisioning otherwise, the 911 call would be undesirably routed to the PSAP 62 serving the region 32, rather than to the PSAP 60 serving the region 30 where the user is currently located.

Accordingly, a new and improved system and/or method for handling voice-over-packet emergency calls is disclosed that overcomes the above-referenced problems and others.

SUMMARY

In accordance with one embodiment, a method is provided for routing an emergency call from Customer Premises Equipment (CPE) to a Public Safety Answering Point (PSAP). The method includes: establishing a session over a packet-switched network between a CPE and a network node, such that the CPE accesses a Public Switched Telephone Network (PSTN) from the network node via a telecommunications switch associated with a first PSAP serving a geographic region different than where the CPE is currently located; identifying a telephone number for a second PSAP serving the geographic region in which the CPE is located; and, substituting the identified telephone number for a dialed telephone number when the dialed telephone number is indicative of an emergency call.

In accordance with another aspect, a system is provided for routing an emergency call from Customer Premises Equipment (CPE) to a Public Safety Answering Point (PSAP). The system includes: means for establishing a session over a packet-switched network between a CPE and a network node, such that the CPE accesses a Public Switch Telephone Network (PSTN) from the network node via a telecommunications switch associated with a first PSAP serving a geographic region different than where the CPE is currently located; means for identifying a telephone number for a second PSAP serving the geographic region in which the CPE is located; and, means for substituting the identified telephone number for a dialed telephone number when the dialed telephone number is indicative of an emergency call.

Numerous advantages and benefits of the inventive subject matter disclosed herein will become apparent to those of ordinary skill in the art upon reading and understanding the present specification.

BRIEF DESCRIPTION OF THE DRAWINGS

The present inventive subject matter may take form in various components and arrangements of components, and in various steps and arrangements of steps. The drawings are only for purposes of illustrating example embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components and features that are commonly known in the telecommunications art without further detailed explanation as to their configuration or operation except to the extent they have been modified or altered in accordance with and/or to accommodate the embodiment(s) presented herein.

Figure 1:
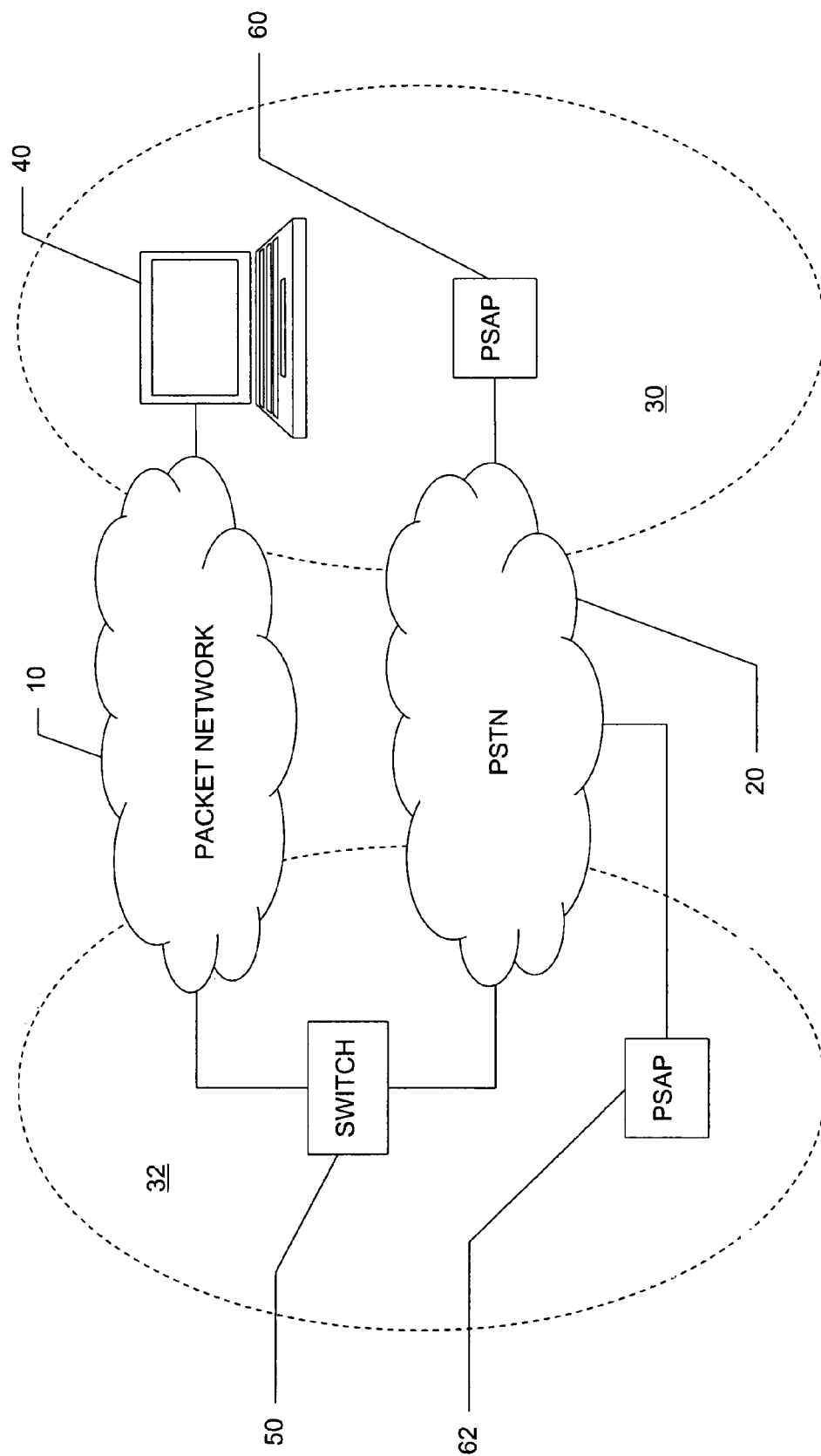
FIG. 1 is a block diagram illustrating an example of a conventional telecommunications network for handling 911 calls.
Figure 2:
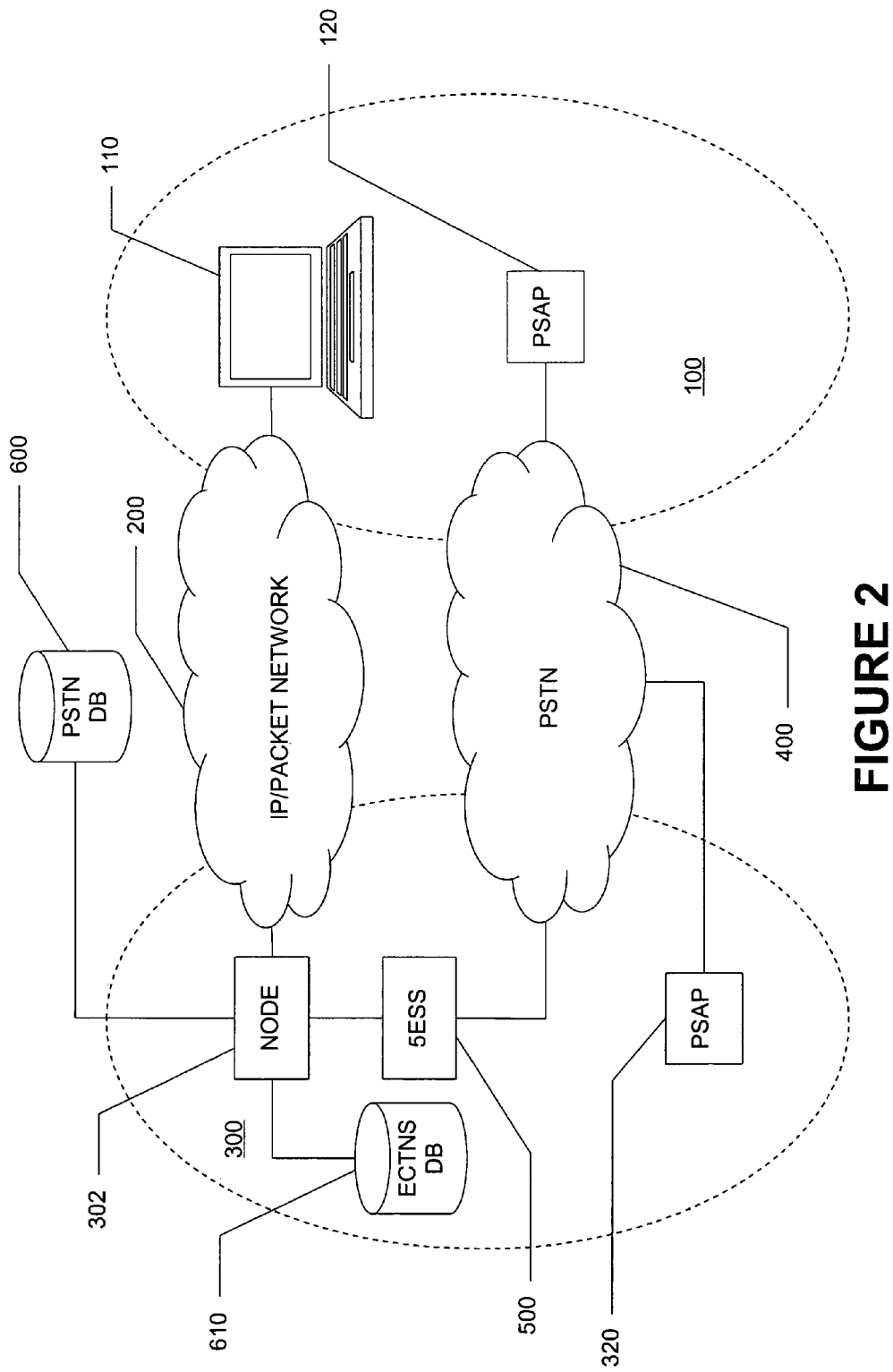
FIG. 2 is a block diagram illustrating an exemplary telecommunications network suitable for practicing aspects of the present inventive subject matter.

With reference to FIG. 2, a user is located in a first geographic region 100, and uses customer premises equipment (CPE) 110 to selectively place telephone calls. The CPE 110, as illustrated, is an IP telephone, suitably, a hardphone or a softphone running as an application on a general purpose computer, laptop computer or other suitable platform. However, the CPE 110 may be any traditional packet-based CPE, e.g., used to engage in VoIP, voice-over-packet, facsimile, data or other like calls. In the usual manner, the CPE 110 operatively connects with a packet-switched network 200, such as the Internet or another managed or unmanaged packet-switched network.

Suitably, the CPE 110 connects via the packet-switched network 200 to an IP or packet-based entity and/or connection point 302 in a second geographic region 300 that is different from the first geographic region 100. For example, the second geographic region 300 may include the user's home region or the user's home office or normal place of business. Accordingly, the CPE 110 accesses the PSTN 400 from the connection point or node 302 via a telecommunications switch 500 serving the second region 300. Optionally, the connection point 302 is the following mentioned gateway or softswitch, or alternately, it may be an IP or packet-based Centrex or PBX supported, respectively, by the switch 500 or at the user's home office or normal place of business. It is to be appreciated that, suitably, the remote location 100 is geographically distinct from the home location 300, at least insomuch as the remote location 100 is served by a PSAP 120 that is different from a PSAP 320 serving the home location 300.

Suitably, the switch 500 is a class 5 switch such as the Lucent Technologies 5ESS or another like circuit switch. The switch 500 is optionally paired with an appropriate gateway for bridging together circuit-switched and packet-switched networks. The telecommunications switch 500 is operatively connected to the PSTN 400 in the usual manner. The gateway (e.g., an IP gateway) is operatively connected between the switch 500 and the packet-switched network 200 thereby bridging the packet-switched network 200 with the PSTN 400 in the usual manner. That is to say, the gateway acts as a point of entry for packet-switched calls from the network 200 headed into the PSTN 400, and similarly acts as a point of entry for circuit-switched calls from the PSTN 400 headed into the packet-switched network 200. In the usual manner, the gateway selectively converts and/or translates packet-switched calls into circuit-switched calls and vice versa depending on the direction of traffic flow. For example, a suitable gateway is an iMerge® gateway provided by Lucent Technologies. Optionally, the combination of the switch and gateway is replaced by a softswitch that acts as the functional equivalent of the combination.

Before calls are placed with the CPE 110, it is first registered with the connection point or entity 302. At registration, the location of the CPE 110 is determined. That is to say, it is determined if the CPE 110 is connecting from a remote location, such as region 100. Suitably, upon initialization of the remote CPE 110 (e.g., at the time of connection to the packet-switched network 200), a registration message is sent from the CPE 110, over the packet-switched network 200 to the connection point or entity 302. The location of the CPE 110 is optionally recognized as remote based upon where it is accessing the connection point 302 from, e.g., the location is deemed remote if the CPE 110 is not accessing the connection point or entity 302 from a known local IP address. If deemed to be accessing remotely, a current location for the remote CPE 110 is then established.

To establish the remote location of the CPE 110, an identifier indicative of the remote location is obtained, e.g., from the registration message or at the time of registration. Suitably, the identifier is a local telephone number associated with the CPE's current location. For example, if the CPE 110 connects to the packet-switched network via a dial-up connection, through a modem pool or via a remote access server, the local number associated with the CPE's current location, is optionally obtained by the connection point or entity 302 via caller-ID, an Automatic Number Identification (ANI) spill, or the like. Alternately, the CPE 110 may be connecting, e.g., from a known non-local IP address such as an IP address for a branch office located in the region 100. In this case, the connection point or entity 302 may optionally be provisioned with particular telephone numbers associated with locations within which particular ranges of IP addresses are used, or they may be obtainable from a suitable database. In yet another embodiment, if the associated local telephone for the CPE's current location is not automatically detected and/or obtained by one of the two means described previously, a dialog is launched between the CPE 110 and the connection point 302 in which the user may manually enter the local telephone associated with the CPE's current location.

Once the current remote location of the CPE 110, and hence the remote user, has been established, the telephone number (e.g., a North American Numbering Plan (NANP) telephone number) for the PSAP serving that remote location is obtained or otherwise determined. Suitably, a PSAP database 600 is maintained that is accessible by the connection point or entity 302. The database 600 contains a look-up table (LUT) or otherwise relates input telephone numbers with telephone numbers for the various PSAPs. That is to say, given a particular input telephone number, the database returns or otherwise provides the telephone number for the PSAP serving the geographic region corresponding to the given input telephone number. Suitably, the previously obtained local telephone number associated with the CPE's current remote location is used to query the database 600. For example, the query may be accomplished by the use of an IP or other packet-switched message, optionally, sent to a PSTN SCP (Service Control Point). Such an arrangement would allow the database 600 to be used directly by IP or packet capable agents, as well as SS7 (Signaling System 7) based switches within the PSTN 400.

Once the appropriate PSAP telephone number is identified and/or obtained, it is substituted as the dialed telephone number should a 911 call be placed from the remotely located CPE 110. In one embodiment, for example, the identified PSAP telephone number is forwarded to the CPE 110 during the registration process. The CPE 110 is accordingly programmed and/or provisioned to store the received PSAP telephone for the duration of the session and substitute it as the dialed telephone number should a user dial 911 on the CPE 110. Alternately, the substitution is made by and/or takes place at the connection point or entity 302. For example, a Emergency Call Telephone Number Substitution (ECTNS) database 610 is optionally maintained. Suitably, the database 610 contains a list of registered remote CPE along with the respective PSAP telephone number corresponding to the current remote location of each CPE. In either case, when a 911 call is placed from the CPE 110 located in region 100, the telephone number for the PSAP 120 serving the region 100 is substituted as the dialed number. Recall, that at or about the time of registration of the CPE 110 with the connection point or entity 302, the telephone number for the PSAP 120 was read or otherwise obtained from the database 600.

Consequently, when 911 (or another recognized emergency call number) is dialed on the remotely located CPE 110, the telephone number for the PSAP 120 is effectively called and the call is therefore routed over the PSTN 400 or otherwise to the PSAP 120. As can be appreciated, this is the proper PSAP serving the current location of the CPE 110 and its user.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for routing an emergency call from an internet protocol (IP) telephone to a Public Safety Answering Point (PSAP), the method comprising:
   (a) establishing a session over an IP network between a an IP telephone and a network node associated with the IP network, such that the IP telephone and network node access a Public Switched Telephone Network (PSTN) via a telecommunications switch, the network node and the telecommunications switch serving a first geographic region associated with a first PSAP different than a second geographic region where the IP telephone is currently located, the second geographic region associated with a second PSAP;
   (b) identifying at the network node a telephone number for the second PSAP serving the second geographic region in which the IP telephone is located;
   (c) forwarding the identified PSAP telephone number to the IP telephone;
   (d) storing the identified telephone number at the IP telephone for later use should an emergency call be placed; and,
   (e) substituting the identified telephone number for a dialed telephone number when the dialed telephone number is indicative of an emergency call, such that the IP telephone makes the substitution upon a user dialing an emergency telephone number associated with the emergency call.

2. The method of claim 1, further comprising:
   registering the IP telephone with the network node; and, determining from the registration if the IP telephone is remote from the first geographic region served by the first PSAP.

3. The method of claim 2, further comprising:
   obtaining a Directory Number (DN) associated with the IP telephone's location, said DN corresponding to a location within the second geographic region served by the second PSAP.

4. The method of claim 3, wherein when the session established in step (a) is via dial-up access, a modem pool or a remote access server, the DN is obtained via caller-ID.

5. The method of claim 3, wherein when the session established in step (a) is at a non-local IP address, the DN is obtained from a local database relating ranges of IP addresses to example telephone numbers within the same geographical location as is served by a range of IP addresses.

6. The method of claim 3, wherein the identified PSAP telephone number in step (b) is obtained from a database relating DNs to the respective PSAP telephone numbers serving the geographic regions to which the DNs correspond.

7. The method of claim 2, further comprising:
   maintaining a list of remote IP telephones registered with the network node along with the PSAP telephone number identified for each registered IP telephone.

8. A system for routing an emergency call from an internet irotocol (IP) telephone to a Public Safety Answering Point (PSAP), the system comprising:
   means for establishing a session over an IP network between an IP telephone and a network node associated with the IP network, such that the IP telephone and the network node access a Public Switched Telephone Network (PSTN) via a telecommunications switch, the network node and the telecommunications switch serving a first geographic region associated with a first PSAP different than a second geographic region where the IP telephone is currently located, the second geographic region associated with a second PSAP;
   means for identifying at the network node a telephone number for the second PSAP serving the second geographic region in which the IP telephone is located;
   means for forwarding the identified telephone number to the IP telephone; and,
   means for substituting the identified telephone number for a dialed telephone number when the dialed telephone number is indicative of an emergency call, such that the IP telephone makes the substitution upon a user dialing an emergency telephone number associated with the emergency call.

9. The system of claim 8, further comprising:
   means for registering the IP telephone with the network node; and,
   means for determining from the registration if the IP telephone is remote from the first geographic region served by the first PSAP.

10. The system of claim 9, further comprising:
    means for obtaining a Directory Number (DN) associated with the IP telephone's location, said DN corresponding to a location within the second geographic region served by the second PSAP.

11. The system of claim 10, wherein when the session established is via dial-up access, a modem pool or a remote access server, the DN is obtained via caller-ID.

12. The system of claim 10, wherein the identified PSAP telephone number is obtained from a database relating DNs to the respective PSAP telephone numbers serving the geographic regions to which the DNs correspond.

13. The system of claim 9, further comprising:
means for maintaining a list of remote IP telephones registered with the network node along with the PSAP telephone number identified for each registered IP telephone.

14. The system of claim 8, wherein the network node comprises at least one of an IP gateway or a Private Branch eXchange (PBX).

15. The system of claim 8, wherein the network node comprises a Centrex supported on the telecommunications switch.

16. The system of claim 8, wherein the telecommunications switch is a softswitch comprising the network node.

17. The system of claim 8, the system further comprising:
means for storing the identified telephone number for later use should an ergency call be placed.

18. A method for routing an emergency call from an internet protocol (IP) telephone to a Public Safety Answering Point (PSAP), the method comprising:
(a) establishing a session over an IP network between a an IP telephone and a network node associated with the IP network where the IP telephone and network node would access a Public Switched Telephone Network (PSTN) via a telecommunications switch, the network node and the telecommunications switch located in a first geographic region associated with a first PSAP and the IP telephone is in a second geographic region associated with a second PSAP;
(b) identifying at the network node a substitute telephone number associated with the second PSAP;
(c) forwarding the substitute telephone number to the IP telephone; and
(d) substituting the substitute telephone number for a dialed telephone number at the IP telephone after a user dials an emergency telephone number indicative of an emergency call.

19. The method of claim 18, further comprising:
(e) storing the substitute telephone number before the emergency call is placed for later use after the emergency call is placed.

20. The method of claim 18, the establishing in (a) comprising:
(e) registering the IP telephone with the network node; and,
(f) determining from the registration that the IP telephone is in the second geographic region.

21. The method of claim 20, further comprising:
(g) obtaining a Directory Number (DN) associated with the IP telephone's location via caller-ID, said DN corresponding to a location within the second geographic region, wherein when the session established in (a) is via dial-up access, a modem pool or a remote access server.

22. The method of claim 20, further comprising:
maintaining a list of remote IP telephones registered with the network node along with the PSAP telephone number identified for each registered IP telephone.

* * * * *